United States Patent [19]

Sugio et al.

[11] 4,224,435

[45] Sep. 23, 1980

[54] METHOD FOR MIXING RAW MATERIALS FOR PRODUCING OXYMETHYLENE COPOLYMERS

[75] Inventors: Akitoshi Sugio, Omiya; Akira Amamiya, Tokyo; Tadashi Kunii, Yotsukaichi; Tomotaka Furusawa; Mutsuhiko Takeda, both of Matsudo; Katsumasa Tanaka, Yotsukaichi; Toshikazu Umenura, Tokyo; Kiyokazu Kawaguchi, Matsudo, all of Japan

[73] Assignee: Mitsubishi Gas chemical Company, Inc., Tokyo, Japan

[21] Appl. No.: 48,178

[22] Filed: Jun. 13, 1979

[30] Foreign Application Priority Data

Jun. 13, 1978 [JP] Japan ............................ 53-070307

[51] Int. Cl.$^3$ ............................................ C08G 2/10
[52] U.S. Cl. .................................. 528/232; 528/241; 528/249
[58] Field of Search ..................... 528/232, 241, 249

[56] References Cited

U.S. PATENT DOCUMENTS

| | | | |
|---|---|---|---|
| 3,254,053 | 5/1966 | Fisher et al. | 528/241 |
| 3,442,866 | 5/1969 | Seddon et al. | 528/232 X |
| 4,045,415 | 8/1977 | Sextro et al. | 528/232 |
| 4,105,637 | 8/1978 | Semanchik et al. | 528/241 |

*Primary Examiner*—Lucille M. Phynes

[57] ABSTRACT

In a method for mixing a trioxane, a polymerization catalyst and a comonomer for producing of oxymethylene copolymers by continuously copolymerizing trioxane with a cyclic ether or a cyclic acetal as a comonomer, the improved method comprises following steps:

spouting a comonomer and a polymerization catalyst from nozzle openings which are set adjacent to each other, while washing both openings at the tip end of the nozzles with a flow of trioxane, whereby mixing said comonomer, said polymerization catalyst and said trioxane, and then feeding the mixture to a polymerization reactor to effect copolymerization.

The raw materials are mixed together before they are fed to the polymerization reactor, and no clogging trouble at the tip end of the nozzle for feeding a polymerization catalyst occurs. Further the resulting copolymer has a much superior heat stability. In addition, since each of the reaction raw materials is quantititively fed, the molecular weight and conversion of the copolymer extended from the polymerization reactor is so constant that a stabilized operation of the polymerization reactor can be secured.

10 Claims, 9 Drawing Figures

4,224,435

METHOD FOR MIXING RAW MATERIALS FOR PRODUCING OXYMETHYLENE COPOLYMERS

BACKGROUND OF THE INVENTION

The present invention relates to a process for mixing polymerization raw materials by continuously mixing trioxane, a comonomer which is copolymerizable therewith and a polymerization catalyst and feeding them into a polymerization reactor in the production of polyacetals, and an apparatus therefore.

Oxymethylene copolymers containing about 60 to 99.6% of oxymethylene units and a balance of repetition units of (—c—c—) have been known as a very useful plastic for industrial uses.

Processes for producing the above-mentioned oxymethylene polymers have heretofore been studied, and above all, processes of employing trioxane as a starting raw material have been particularly developed due to easy purification of trioxane.

Processes for producing oxymethylene copolymers employing trioxane include a batch system and a continuous system.

In the batch production process, liquid trioxane, a comonomer and a polymerization catalyst, each in a fixed amount, are fed into a reactor and mixed together with stirring to obtain polymer. This process, however, has drawbacks that the reaction product forms a mass with the progress of a rapid polymerization reaction, adequate temperature control of polymerization substances is difficult, milling of final polymer is not easy and discharge of product is difficult.

On the other hand, in the continuous process, trioxane and a comonomer ring are subjected to bulk polymerization while the reaction temperature is adjusted, and oxymethylene copolymer is obtained as a milled product. In an example, a reaction mixture is fed into a continuous polymerization apparatus from its inlet, and polymerized in a reaction zone. The resulting polymer is mechanically milled, carried and taken out of its exit. According to such a continuous bulk polymerization, the amounts of solvent and catalyst employed are small and a copolymer can be obtained at a high conversion, and hence the process is a very advantageous one as a commercial process for polyacetal resins.

However, for completing this technique, certain problems should be solved. One of them is to develop a mixing method for enabling to continuously mix together trioxanes, a comonomer and a polymerization catalyst and quantitatively feed them into a continuous polymerization reactor. When trioxane containing substantially no solvent is mixed with a polymerization catalyst, polymerization reaction immediately starts and the reaction mixture solidifies. Thus, polymer adheres to the tip end of the catalyst-feeding nozzle, and feed often becomes impossible, resulting in an obstacle to a smooth continuous polymerization. In order to prevent this, processes such as incessant washing of the tip end of the catalyst-feeding nozzle with a large amount of a solvent, or adding large amount of a solvent to trioxane and comonomer to be fed, have been proposed, but these processes are deviated from the object of the bulk polymerization and commercially unadvantageous. Treatments such that the tip end of the catalyst-feeding nozzle is often taken out and cleaned may be carried out, but, in these cases, such problems are raised that mixing-in of moisture in air or variability of the amount of catalyst fed occurs, resulting in constant molecular weight of polymer extruded from a continuous polymerization reactor as well as inconstant conversion.

SUMMARY OF THE INVENTION

The object of the present invention is to provide a method for mixing to obtain oxymethylene copolymers according to a commercially advantageous continuous bulk polymerization, and the invention resides in the following process:

In the continuous polymerization reaction wherein trioxane is copolymerized with a cyclic ether or a cyclic acetal to obtain an oxymethylene copolymer.

A method which comprises spouting a comonomer and a polymerization catalyst from nozzle openings which are set adjacent to each other, while washing both openings at the tip end of the nozzles with a flow of trioxane, whereby mixing said comonomer, said polymerization catalyst and said trioxane, and then feeding the mixture to a polymerization reactor to effect copolymerization.

BRIEF DESCRIPTION OF THE DRAWINGS

FIGS. 1–4 show the cross-sectional views of apparatuses for mixing polymerization raw materials; FIG. 5 shows the lateral side view of a polymerization reactor equipped with said mixing apparatuses (partly cutaway);

FIG. 6 shows a cross-sectional view of FIG. 5 taken along the line VI—VI of FIG. 5;

FIG. 7 shows a cross-sectional view; and

FIGS. 8 and 9 show the lateral side views of polymerization reactors wherein the vicinity of the raw materials-feeding port is partly cut away.

DETAILED DESCRIPTION OF THE INVENTION

Figure 1:
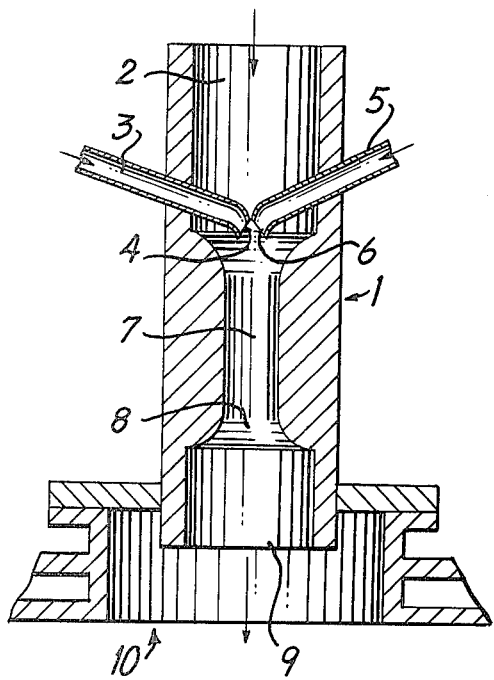
FIGS. 1–6 show embodiments of the present invention.

As described above, the present invention comprises, as basic steps, spouting a comonomer and a polymerization catalyst from nozzle openings which are set adjacent to each other, while washing both openings at the tip end of the nozzles with a flow of trioxane, whereby mixing said comonomer, said polymerization catalyst and said trioxane, and then feeding the mixture to a polymerization reactor to effect copolymerization.

The reaction mixture referred to herein means a mixture of trioxane, a comonomer and a polymerization catalyst as main components and besides, small amounts of a solvent and other additives.

In the present invention, it is indespensable that the opening at the tip end of a nozzle for feeding a comonomer is made adjacent to the opening at the tip end of a nozzle for feeding a polymerization catalyst. If both the openings are not made adjacent, polymer is immediately formed at the opening at the tip end of a nozzle for feeding a polymerization catalyst and clogs the opening, resulting in incapability of feeding the polymerization catalyst. Further, even in the case of a process of pouring a polymerization catalyst into a mixture of trioxane with a comonomer, the clogging of the opening at the tip end of a nozzle for feeding a polymerization catalyst cannot be also avoided.

Comonomer is herein employed for stabilizing the polymerization into trioxane polymer. Besides this effectiveness, according to the mixing process of the present invention, the comonomer exhibits the following effectiveness:

If the tip end of the nozzle for feeding a comonomer is separate from that for feeding a polymerization catalyst, a considerably hard polymer is formed since just after the flow of trioxane has been mixed with a polymerization catalyst, and its polymer clogs the tip of the nozzle for feeding a catalyst. It goes without saying that in case where the respective tip ends of the nozzle for feeding a comonomer and that for feeding a polymerization catalyst are not washed, polymer is also formed there and clogs them as well, resulting in incapability of feeding catalyst. Further, for the flow of trioxane which washes the tip ends of both the nozzles as well as the flow of the reaction mixture downstream from the above-mentioned flow, a fixed flow rate or higher is required. Namely, at the tip ends of both the nozzles and downstream from them, it is desirable that the rate be 20 cm/sec. or higher, preferably 50 cm/sec. or higher. Further the retention time of the reaction mixture in the apparatus of the present invention is preferably 10 second or shorter, more preferably 5 seconds or shorter.

The comonomer employed in the present invention is a cyclic ether or a cyclic acetal and a compound expressed by the general formula (I) mentioned below. The amount of the comonomer employed is 0.4–40% by mol, preferably 0.4–10% by mol.

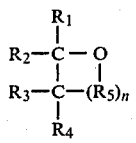

wherein $R_1$, $R_2$, $R_3$ and $R_4$ are the same or different and each represent hydrogen atom, an alkyl group of a halogen-substituted alkyl group; $R_5$ represents methylene group or oxymethylene group or an alkyl group-substituted or a halogenated alkyl group-substituted methylene group or oxymethylene group, (in this case, n being an integer of 0—3), or a compound of $-(CH_2)_m-O-CH_2-$ or $(-O-CH_2-CH_2-)_m\ O-CH_2-$ (in this case, n is equal to 1 and m represents an integer of 1–4); and said alkyl group has 1–5 carbon atoms and can be replaced by 0–3 halogen atoms, particularly chlorine atom(s).

For the cyclic acetal or cyclic ether, ethylene oxide, glycol formal, diglycol formal, and among these, diglycol formal are particularly suitable. Further, for example, propylene oxide and epichlorohydrin can be also employed. Still further, a cyclic formal of long chain α, ω-diol, e.g. butanediol formal (1, 3-dioxcepane) or hexanediol formal thereof is also suitable.

As for the polymerization catalyst, known cationic polymerization catalysts are employed, and particularly one kind or more of boron fluoride, boron fluoride hydrate and coordinate compounds of boron fluoride with an oxygen atom—or sulfur atom—containing compound can be employed in the form of vapor or a solution thereof in a suitable organic solvent. Coordinate compounds of boron fluoride, particularly boron fluoride etherate and boron fluoride butyrate are preferably polymerization catalysts.

Besides these, molecular weight modifiers such as methylal, polyoxymethylene dimethoxide, alcohols, e.g. methanol, ethanol, etc., phenolic compounds, etc. and other additives may be mixed with trioxane in advance.

Further, it is also possible to mix them with polymerization raw materials by feeding them into the apparatus for feeding polymerization raw materials, of the present invention, by means of another nozzle.

In the present invention, it is preferable that trioxane contain no solvent or 20% by weight or less of a solvent. Comonomer is fed as it is or diluted with a solvent and fed. Polymerization catalyst is fed as it is or diluted with a solvent and fed in the form of vapor or liquid.

Figure 3:
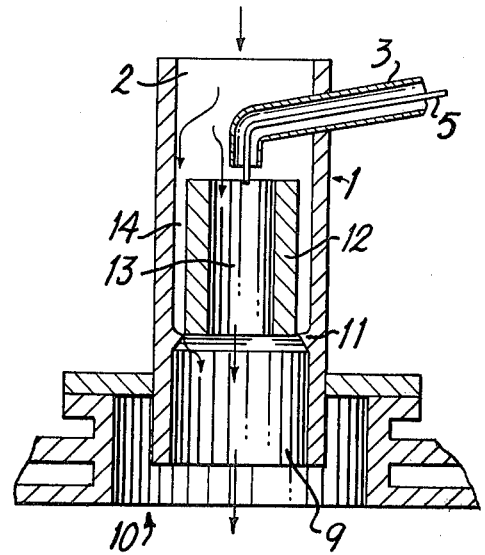
Figure 2:
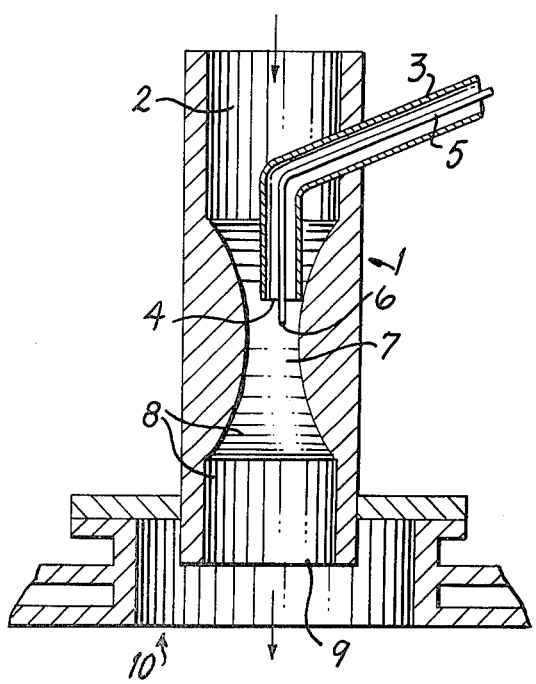
Figure 4:
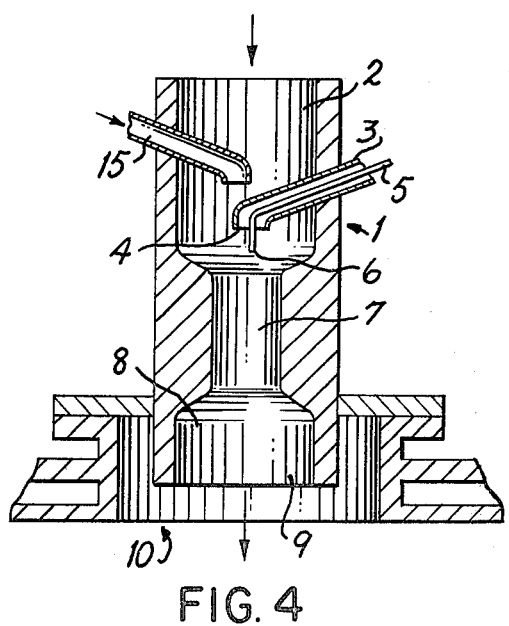

Next, the apparatus for carrying out the process for mixing polymerization raw materials, of the present invention will be illustrated referring to FIGS. 1-4. Numeral 1 shows an apparatus for mixing polymerization raw materials; numeral 2, a flow-in path of trioxane; numeral 3, a nozzle for feeding a comonomer; numeral 4 its tip end; numeral 5, a nozzle for feeding a catalyst; and numeral 6, its tip end. Downstream from both the tip ends is located a mixing chamber 8, and preferably an orifice 7 is provided above the mixing chamber 8. Numeral 9 shows a port for feeding a reaction mixture and numeral 10 shows a polymerization reactor. Two nozzles 3 and 5 as shown in FIG. 1 are contacted at the upper parts of the tip ends 4 and 6, and opened in an opposed manner. Accordingly, the comonomer and the polymerization catalyst are contacted with each other at the same time when they are extruded from the nozzles, and further mixed with trioxane. While they are passed through the orifice 7, they are uniformly mixed together, and their flow rate is somewhat reduced at the lower part of the mixing chamber 8 and then quietly fed into a polymerization reactor 10. FIGS. 2-4 show a double pipe structure, the outer pipe being a nozzle for feeding a comonomer 3 and the inner pipe being a nozzle for feeding a catalyst 5, the tip end 6 of which is protruded somewhat outwards from the tip end 4 of the nozzle for feeding a comonomer 3 and opened. Thus, in either cases, the tip ends 4 and 6 are incessantly washed by a strong flow of trioxane. In FIG. 3, a projection 11 is provided on the inner wall of a mixing chamber 8 in a ring form, and supports a cylinder 12 thereon. This cylinder 12 is so arranged that a reaction mixture formed by contact of the extrusion from the tip ends 4 and 6 of the nozzles with trioxane immediately flows into the inside 13 of the cylinder. By properly selecting cylinders 12 having the same diameters but different thicknesses, it is possible to obtain a desired linear velocity inside the cylinder. A part of trioxane fed passes through a space 14 between the outer diameter of the cylinder 12 and the inner diameter of the mixing apparatus 1, passes through between the projection 11, and is combined with the reaction mixture having passed through the inside 13 of the cylinder. Further they are mixed together and then fed to the polymerization reactor through a port for feeding the reaction mixture 9. In FIG. 4, a nozzle for feeding a molecular weight modifier 15 is further provided, and in this case, it is not always necessary to provide the tip end of this nozzle 15 adjacently to the tip ends 4 and 6 of the double pipe.

Figure 5:
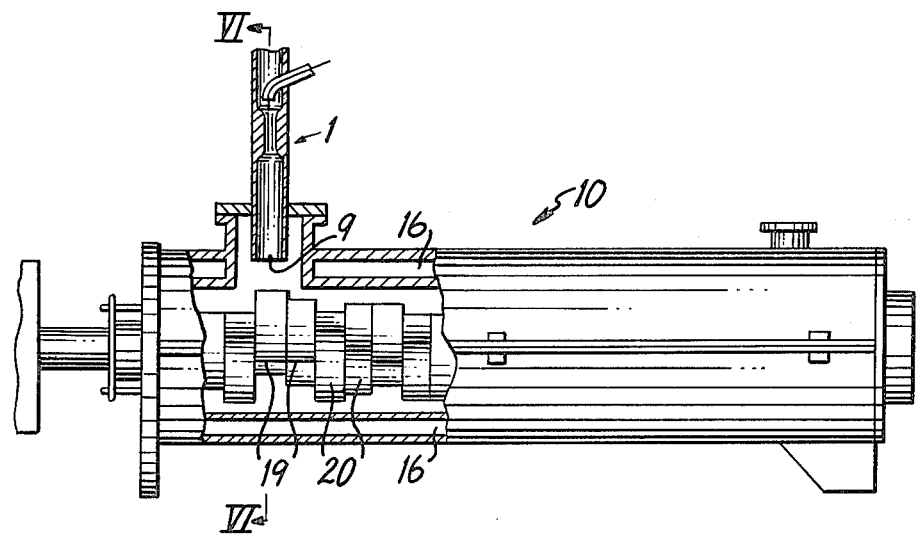
Figure 6:
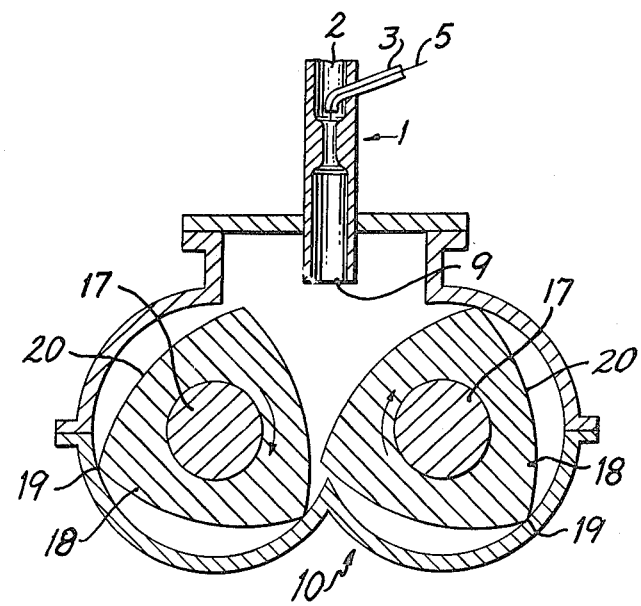

As for the continuous polymerization reactor, there is the one disclosed in Japanese Patent Publication No. 5234/1969 and sold under a tradename of Kokneader. Further, U.S. Pat. No. 3,442,866 discloses a reactor containing a pair of engaged parallel screws in an elongated case. On the other hand, according to the polymerization process developed by the inventors of the present invention, raw material monomers and a polymerization catalyst are fed into a prior stage polymerization reactor having a self-cleaning property to carry out polymerization, and after a conversion in the range of 40-70% has been attained, the resulting reaction mixture is taken out of the exit of the prior stage polymerization reactor in the form of particle. The reaction mixture is then fed into a posterior stage polymerization reactor having no self-cleaning property but an agitating function to carry out a posterior stage polymerization reaction, and after a conversion of 95-100% has been attained, the resulting polymerization product is taken out of the exit of the posterior stage polymerization reactor, in the form of particle. FIGS. 5 and 6 show a state where the apparatus of the present invention is fixed to the above-mentioned prior stage polymerization reactor. Numeral 16 shows a jacket which controls the polymerization temperature through a heating medium therein. The reaction mixture fed through a port for feeding the reaction mixture 9 is led into the inside of a shell. Inside the shell, at least two horizontal agitating shafts 17 having a plurality of paddles 18 in the form of a pseudo-triangle plate fixed thereonto are provided. These shafts are constructed as follows: When the horizontal agitating shafts 17 are rotated at the same time in the same direction, the top edge 19 of the pseudo-triangle plate of the paddle 18 or one of the horizontal agitating shafts 17 is contacted with the inner surface of the reaction shell or the surface 20 of the corresponding paddle 18 fixed onto the other horizontal agitating shaft, while maintaining a slight clearance. Thus the polymerization reaction product adhered onto the inner surface of the reaction shell and the outer peripheral surface of the paddle is incessantly peeled off and gradually carried away from the inlet of the reactor to the exit. The polymerization reaction product extruded from the prior polymerization reactor is carried into the posterior polymerization reactor having a jacket outside it, an agitating mechanism inside it and no self-cleaning mechanism, where the polymerization reaction is completed with a conversion of 95-100%.

According to the present invention, the tip end of the nozzle for feeding a comonomer is made adjacent to the tip end of the nozzle for feeding a polymerization catalyst, and the reaction mixture is fed to the polymerization reactor while the tip ends of both the nozzles are washed by liquid trioxane, and hence the polymerization raw materials are sufficiently mixed together before they are fed to the polymerization reactor, and also the clogging trouble at the tip end of the nozzle for feeding a polymerization catalyst does not occur. Further the heat stability of the resulting copolymer is also much superior. Still further since the respective raw materials are quantitatively fed, the molecular weight of the copolymer and the conversion are constant and also the stabilized operation of the polymerization reactor is secured. Furthermore, according to the present invention wherein a premixing process is carried out, the conversion is superior to that in case where a mixture of trioxane with a comonomer and a polymerization catalyst are fed to the polymerization reactor through separate nozzles. Thus, by employing the mixing apparatus of the present invention in a continuous bulk polymerization reactor, a commercial production of oxymethylene copolymers has become very advantageous.

The present invention will be concretely described by way of Examples and Comparative examples.

EXAMPLE 1

Employing an apparatus for mixing polymerization raw materials shown in FIG. 3, trioxane was fed at a rate of 20 kg/hr. and 1,3-dioxcepane was fed at a rate of 700 g/hr. through the outer pipe of the double pipe i.e. a nozzle for feeding the comonomer 3. Further, 0.20 m.mol of boron trifluoride etherate per mol of trioxane was fed through the inner pipe i.e. a nozzle for feeding a polymerization catalyst 5. The boron trifluoride etherate was employed in the form of a solution in bezene as solvent, containing 0.6 m.mol of boron trifluoride etherate per ml of the solution. The reaction mixture flowed down through the inside of the cylindrical pipe 12 at a linear velocity of 80 cm/sec., and one second after mixing, fed into the polymerization reactor. Further, employing a prior stage polymerization reactor shown in FIG. 5 and having an inner diameter of the reaction shell of 102 mm, a prior stage polymerization reaction was carried out and successively a posterior stage polymerization reaction was carried out. The posterior stage polymerization reactor had a reaction shell equipped with a jacket outside it, and a pair of shafts having a number of mixing blades fixed thereonto, the shafts being a mixer of a non-cleaning property, by which the contents were mixed while the shafts were rotated in different directions to each other. The inner diameter of the reaction shell was 200 mm.

The polymerization temperature was adjusted to 90° C. at the prior stage and to 60° C. at the posterior stage. The polymerization reaction was continued over 100 hours during which it was maintenance-free, and even after 100 hours, no abnormality was observed. Further, during the reaction, a polymer having an intrinsic viscosity of 1.43-1.48 as measured in p-chlorophenol containing 2% α-pinene at 60° C. (this measuring method was employed also in the Example and Comparative examples mentioned below) and a polymer content of 99.5-99.9% was stably extruded from the posterior stage polymerization reactor.

EXAMPLE 2

Employing an appratus for mixing polymerization raw materials, shown in FIG. 1, trioxane was fed at a rate of 2 kg/hr. and liquefied ethylene oxide was fed at a rate of 50 g/hr. through the nozzle for feeding a comonomer 3. Further 0.18 m.mol of boron trifluoride etherate per mol of trioxane was fed through the nozzle for feeding a polymerization catalyst 5. The boron trifluoride etherate was employed in the form of a solution in benzene as solvent, containing 0.1 m.mol of boron trifluoride etherate per ml of the solution. Further, the linear velocity of the reaction mixture in the orifice 7 was about 30 cm/sec. The period of time since mixing together of trioxane, ethylene oxide and the polymerization catalyst till feeding into the polymerization reactor, i.e. the retention time inside the mixing chamber 8, was one second. For the continuous polymerization reactor, the one consisting of a prior stage polymerization reactor and a pin mixer connected thereto was employed. This pin mixer had a shaft with many pins in a elongated case and was employed as a posterior stage polymerization reactor. The inner diameter of the interior polymerization reactor was 50 mm, and two horizontal agitating shafts 17 were so constructed that onto the respective shafts were fixed paddles 18 consisting of a number of ellipsoidal plates, engaged with the couterpart plates, and being capable of cleaning the inner surface of the reaction shell and the surface of the counterpart ellipsoidal plates with the major axis parts of the ellipsoidal plates. The polymerization temperature was adjusted to 80° C. A crude polymer having a polymer content of 68.0% by weight was extruded from the posterior stage polymerization reactor, and fed to a pin mixer where it was subjected to a further mixing. From this pin mixer was extruded a polymer having a polymer content of 99.5% by weight and an intrinsic viscosity of 1.62. A continuous polymerization was continued over 300 hours during which no trouble such as clogging due to polymer formed, etc. in the mixing apparatus occurred. The polymerization reaction was also stationary and the intrinsic viscosity and polymer content of the extruded polymer were also nearly constant. Polymerization reaction was stopped after 300 hours, and no abnormality was observed in this apparatus.

To the polymer thus obtained was added triphenylphosphine in an amount of twice the mols of the polymerization catalyst employed to deactivate the catalyst, and then 0.5 part of Irganox 295 (tradename), 0.2 part of polyvinyl pyrrolidone and 0.1 part of calcium hydroxide were added, and further, they were kneaded, as they were, at 200° C. for 20 minutes by means of a kneader to stabilize the polymer. Thus stabilized polymer had an intrinsic viscosity of 1.60 and its reduction rate $K_{222}^{air}$ in the air at 222° C. due to thermal decomposition was 0.01% by weight. Further the yield of the stabilized polymer from the crude polymer at the time of the stabilization was 94%.

In addition, for comparison, the tip ends 4 and 6 of the nozzles were provided so as to be 3 cm apart away from each other, in the apparatus for mixing polymerization raw materials, shown in FIG. 1, and except for this, trioxane, ethylene oxide and boron trifluoride etherate were fed in the same manner as mentioned above. After 10 minutes, polymer began to be formed at the tip end 6 of the nozzle 5, and before long the feed of the catalyst solution became impossible.

COMPARATIVE EXAMPLE 1

Figure 7:
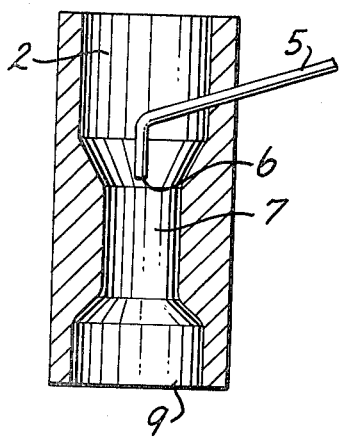
FIGS. 7–9 show a prior art.

Employing the apparatus shown in FIG. 7, a mixture of trioxane with 2.5% by weight based on trioxane of ethylene oxide was fed through a flow-in path for trioxane at a rate of 2 kg/hr. Boron trifluoride etherate in an amount of 0.18 m. mol per mol of trioxane was fed through a nozzle for feeding a catalyst 5. The boron trifluoride etherate was employed in the form of a solution in benzene as solvent, containing 0.1 m.mol of boron trifluoride ether per ml of the solution. The reaction mixture had a linear velocity of 50 cm/sec at the orifice part 7, and one second after mixing, was sent into the polymerization reactor. As a result, after 30 minutes, polymer adhered onto the tip end 6 of the nozzle for feeding a catalyst 5, and clogged it. The orifice part 7 was also clogged by this polymer to make the feeding of the liquid impossible.

COMPARATIVE EXAMPLE 2

Figure 8:
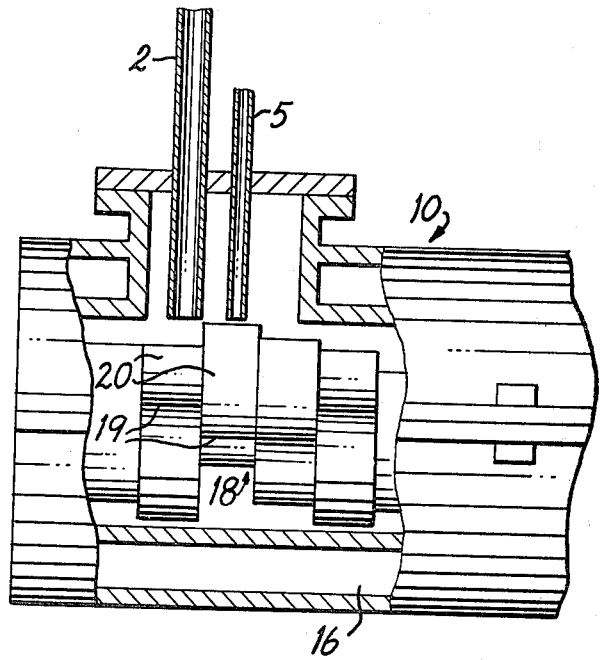

As shown in FIG. 8, a mixture of trioxane with 2.5% by weight based on trioxane of ethylene oxide was fed directly to the polymerization reactor through a flow-in path for trioxane 2 at a rate of 20 kg/hr. On the other hand, boron trifluoride etherate was fed directly to the polymerization reactor through a nozzle for feeding a catalyst 5. The polymerization reactor employed was the same as that employed in Example 1. The boron trifluoride etherate was employed in the form of a solution in benzene as solvent containing 0.6 m.mol of the etherate per ml of the solution, and 0.2 m.mol of boron trifluoride per mol of trioxane was fed. Thirty minutes after start of the polymerization, polymer adhered onto the tip end 6 of the nozzle for feeding a catalyst 5, and feed of liquid became impossible. This compelled operations of taking off the nozzle for feeding a catalyst 5 each 15 minutes-30 minutes and removing polymer at the tip end 6. Accordingly the polymerization reaction became unstationary, and the polymer content of the polymer extruded from the prior stage polymerization reactor varied greatly between 50% and 60%, and also the intrinsic viscosity varied between 1.3 and 1.5.

COMPARATIVE EXAMPLE 3

Figure 9:
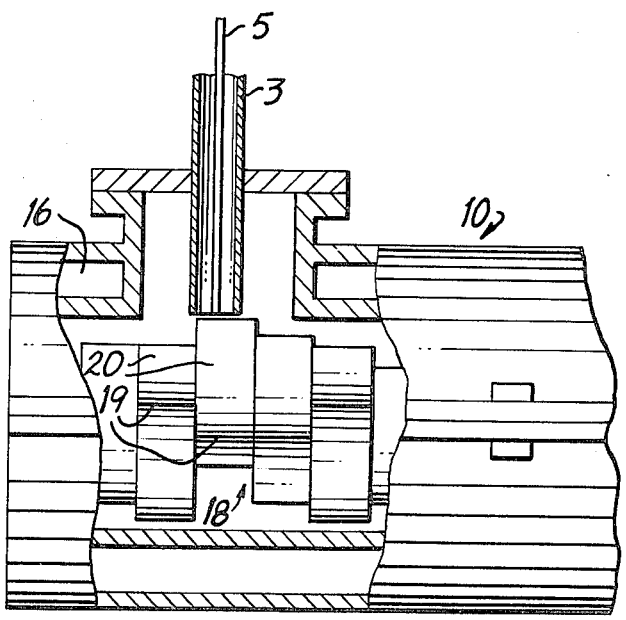

As shown in FIG. 9, a mixture of trioxane with 2.5% by weight based on trioxane of ethylene oxide, through the outer pipe of the double pipe, and boron trifluoride etherate, through the inner pipe thereof i.e. a nozzle for feeding a catalyst 5, were fed directly to the polymerization reactor, which was the same as that employed in Example 1. The tip end of the double pipe was so constructed that the top edge 19 of the paddle 18 of a pseudo-triangle form, fixed onto the horizontal agitating shaft of the polymerization reactor was contacted with the tip end while maintaining a slight clearance when the shaft is rotated. The mixture of trioxane with ethylene oxide was fed at a rate of 20 kg/hr., and the boron trifluoride etherate was fed in the form of a benzene solution containing 0.6 m.mol of boron trifluoride etherate per ml of the solution, at a rate of 0.20 m.mol of boron trifluoride per mol of trioxane. One hour after initiation of polymerization, polymer began to adhere onto the inside of the tip end of the nozzle for feeding a catalyst 5, and feed of liquid became difficult.

What is claimed is:

1. In a method for mixing a trioxane, a polymerization catalyst and a comonomer for producing of oxymethylene copolymers by continuously copolymerizing trioxane with a cyclic ether or a cyclic acetal as a comonomer, the improvement which comprises:
   spouting a comonomer and a polymerization catalyst from nozzle openings which are set adjacent to each other,
   while washing both openings at the tip end of the nozzles with a flow of trioxane,
   whereby mixing said comonomer, said polymerization catalyst and said trioxane,
   and then feeding the mixture to a polymerization reactor to effect copolymerization.

2. A process according to claim 1 wherein, the flow of the reaction mixture has a linear velocity of 20 cm/sec. or higher.

3. A process according to claim 1 or claim 2 wherein said trioxane contains 20% by weight or less of a solvent.

4. A process according to claim 1, claim 2 or claim 3 wherein said comonomer is ethylene oxide.

5. A process according to claim 4 wherein 0.5–5.0% by weight based on trioxane of ethylene oxide as a comonomer is fed.

6. A process according to claim 1, claim 2 or claim 3 wherein said polymerization catalyst is boron trifluoride or its complex compound.

7. A process according to claim 6 wherein 0.03–0.5 m. mol of boron trifluoride or its complex compound per mol of trioxane is fed.

8. A process according to claim 1 wherein said reaction mixture is caused to flow down to said polymerization reactor via a mixing chamber placed between said tip ends and said polymerization reactor.

9. A process according to claim 8 wherein said reaction mixture is passed through an orifice provided inside said mixing chamber.

10. A process according to claim 8 or claim 9 wherein polymerization catalyst is spouting from the nozzle provided inside the nozzle for feeding a comonomer.

* * * * *